US008731992B1

(12) United States Patent
Anthony et al.

(10) Patent No.: US 8,731,992 B1
(45) Date of Patent: May 20, 2014

(54) METHOD AND APPARATUS FOR EVALUATING GEOGRAPHIC MARKET OPPORTUNITY

(75) Inventors: Jaquetta Thomas Anthony, Milsap, TX (US); John Bradford Linthicum, Boston, MA (US); Laura Morgan Patterson, Jacksonville, FL (US); Kelli Reinhardt Walker, Cramerton, NC (US)

(73) Assignee: Bank of America Corporation, Charlotte, NC (US)

( * ) Notice: Subject to any disclaimer, the term of this patent is extended or adjusted under 35 U.S.C. 154(b) by 1826 days.

(21) Appl. No.: 11/754,412

(22) Filed: May 29, 2007

(51) Int. Cl.
 G06Q 10/00 (2012.01)
 G06Q 30/02 (2012.01)
(52) U.S. Cl.
 CPC .................... *G06Q 30/02* (2013.01)
 USPC .......................................... 705/7.29
(58) Field of Classification Search
 CPC ...................................... G06Q 30/02
 USPC ............................................ 705/7.29
 See application file for complete search history.

(56) References Cited

U.S. PATENT DOCUMENTS

| 5,452,410 | A  | * | 9/1995  | Magidson ................... 345/440 |
| 5,608,620 | A  | * | 3/1997  | Lundgren .................... 705/1.1 |
| 7,426,488 | B1 | * | 9/2008  | Gompers et al. ............ 705/36 R |
| 2004/0068431 | A1 | * | 4/2004 | Smith et al. ................... 705/10 |
| 2005/0055275 | A1 | * | 3/2005 | Newman et al. ............... 705/14 |
| 2005/0075961 | A1 | * | 4/2005 | McGill ........................... 705/35 |
| 2005/0171884 | A1 | * | 8/2005 | Arnott ........................... 705/36 |
| 2005/0246255 | A1 | * | 11/2005 | Rousseau et al. ............. 705/35 |
| 2005/0289037 | A1 | * | 12/2005 | Smith et al. .................... 705/36 |
| 2006/0004622 | A1 | * | 1/2006 | Fanelli et al. ................... 705/10 |
| 2006/0224487 | A1 | * | 10/2006 | Galdi ............................. 705/35 |
| 2006/0224494 | A1 | * | 10/2006 | Pinkava ......................... 705/37 |
| 2007/0100724 | A1 | * | 5/2007 | Hollas et al. ................ 705/36 R |
| 2007/0288341 | A1 | * | 12/2007 | Shapack ..................... 705/36 R |
| 2008/0086359 | A1 | * | 4/2008 | Holton et al. .................. 705/10 |
| 2008/0288418 | A1 | * | 11/2008 | Weiss et al. ................ 705/36 R |

OTHER PUBLICATIONS

James Highland, Define the High Market Penetration Index, 1999, eHow.com.*

* cited by examiner

*Primary Examiner* — Johnna Loftis
(74) *Attorney, Agent, or Firm* — Michael A. Springs; Moore & Van Allen, PLLC; Nicholas C. Russell

(57) ABSTRACT

Methods and apparatus for evaluating geographic market opportunity are disclosed. Embodiments of the invention provide scaled market index values that indicate relative market opportunity among geographic statistical areas. Data can be gathered from both internal sources and public sources and the data from the two types of sources can merged to create summarized data corresponding to the geographic statistical areas of interest. A linear regression can be used to determine a scoring equation and average revenue per market. The scoring equation takes into account a plurality of market variables. In example embodiments of the invention, a raw market index is calculated for each geographic statistical area using the scoring equation and the average revenue. A scaled market index can be produced for each geographic statistical area using the raw market index.

22 Claims, 5 Drawing Sheets

| Obs | Market Name | Companies | Deposit Raw Index | Credit Raw Index | Market Penetration | Deposit Raw Index with Pen | Credit Raw Index with Pen | Deposit Scaled Index | Credit Scaled Index |
|---|---|---|---|---|---|---|---|---|---|
| 1 | Metro Area A | 627 | 186.17 | 110.70 | 19.94% | 149.05 | 88.63 | 100.00 | 100.00 |
| 2 | Metro Area B | 337 | 86.99 | 52.27 | 40.95% | 51.37 | 30.87 | 100.00 | 100.00 |
| 3 | Metro Area C | 317 | 58.11 | 39.50 | 16.09% | 48.76 | 33.14 | 97.53 | 100.00 |
| 4 | Metro Area D | 287 | 57.01 | 38.95 | 11.15% | 50.66 | 34.61 | 100.00 | 100.00 |
| 5 | Metro Area E | 270 | 86.15 | 45.82 | 52.96% | 40.52 | 21.55 | 81.05 | 71.84 |
| 6 | Metro Area F | 245 | 96.07 | 38.93 | 25.71% | 71.37 | 28.92 | 100.00 | 96.40 |
| 7 | Metro Area G | 134 | 33.56 | 17.94 | 43.28% | 19.03 | 10.17 | 38.07 | 33.91 |
| 8 | Metro Area H | 124 | 24.38 | 16.81 | 4.03% | 23.40 | 16.13 | 46.80 | 53.78 |

FIG. 5

METHOD AND APPARATUS FOR EVALUATING GEOGRAPHIC MARKET OPPORTUNITY

BACKGROUND

Understanding how to set business goals within a company or enterprise in order to determine how to distribute resources or evaluate performance is of enormous importance and has a significant impact on the company's success in the marketplace. In a geographically distributed business, goals should be monitored, modeled, and optimized taking into account market opportunity relative to specific geographies. In particular, it is important to know how geographic variables affect market opportunity for particular product types and industries. With such knowledge, one can begin to understand how to adjust various goals in order to achieve appropriate performance. It can be difficult to model and describe geographic market opportunity. Often, business goals for various geographies are developed independently within an enterprise and no one person or organization has the comprehensive knowledge necessary to accurately determine how geographic market opportunity varies.

SUMMARY

Embodiments of the present invention provide scaled market index values to facilitate evaluating relative market opportunity among geographic areas serviced by an enterprise. In order to provide the scaled market index for a geographic area, data is gathered from both enterprise sources and public sources and the data from the two types of sources is merged to create summarized data corresponding to geographic statistical areas of interest. Linear regression is used to determine a scoring equation and an average revenue per market. The scoring equation takes into account a plurality of market variables. In example embodiments of the invention, a raw market index is calculated for each geographic statistical area using the scoring equation and average revenue. A scaled market index is produced for each geographic statistical area using the raw market index. The scaled market index is indicative of the relative market opportunity among the geographic areas of interest.

In some embodiments, the raw market index is reduced prior to scaling in accordance with the market penetration of the enterprise. This reduction allows the modeling described herein to account for the fact that customers already served by the enterprise do not represent new market opportunity. In some embodiments, modeling is conducted relative to specific industries, or specific product types offered by the business or enterprise. For example, if the enterprise is a financial institution such as a bank, models may be developed for credit products and deposit products, the latter sometimes being referred to as "treasury and trade" products.

The scaled market indices produced by embodiments of the invention have almost infinite uses. One example use of these indices is to enable more informed goal setting for employees of the enterprise such as sales associates. In some embodiments, the scaled indices are used in this way by applying weighting to a plurality of scaled market index values in accordance with selected geographic statistical areas serviced by an associate to produce weighted market index values. These weighted market index values can then be combined to produce an associate index indicating a relative market opportunity for the associate. This associate index can be used as a factor in evaluating performance to determine compensation.

In some embodiments, the invention is implemented via either a stand-alone computing platform or a computing platform with connectivity to data stores such as that provided by a corporate intranet or local area network. External data can be retrieved via the Internet. A computer program product or computer program products contain computer programs with various instructions to cause the hardware to carry out, at least in part, the methods and processes of the invention. Such a computer program product or software can be a stand-alone program, or a script or macro making use of a Web browser interface or a spreadsheet program. An output device can present the scaled market indices for a plurality of specific industries and product types. In either case a processing platform performs linear regression, evaluates equations and combines the results in the appropriate manner.

BRIEF DESCRIPTION OF THE DRAWINGS

FIG. 5 is a screenshot showing an example scaled market index output by product type and geography in an example embodiment of the invention.

DETAILED DESCRIPTION OF THE INVENTION

Figure 1:
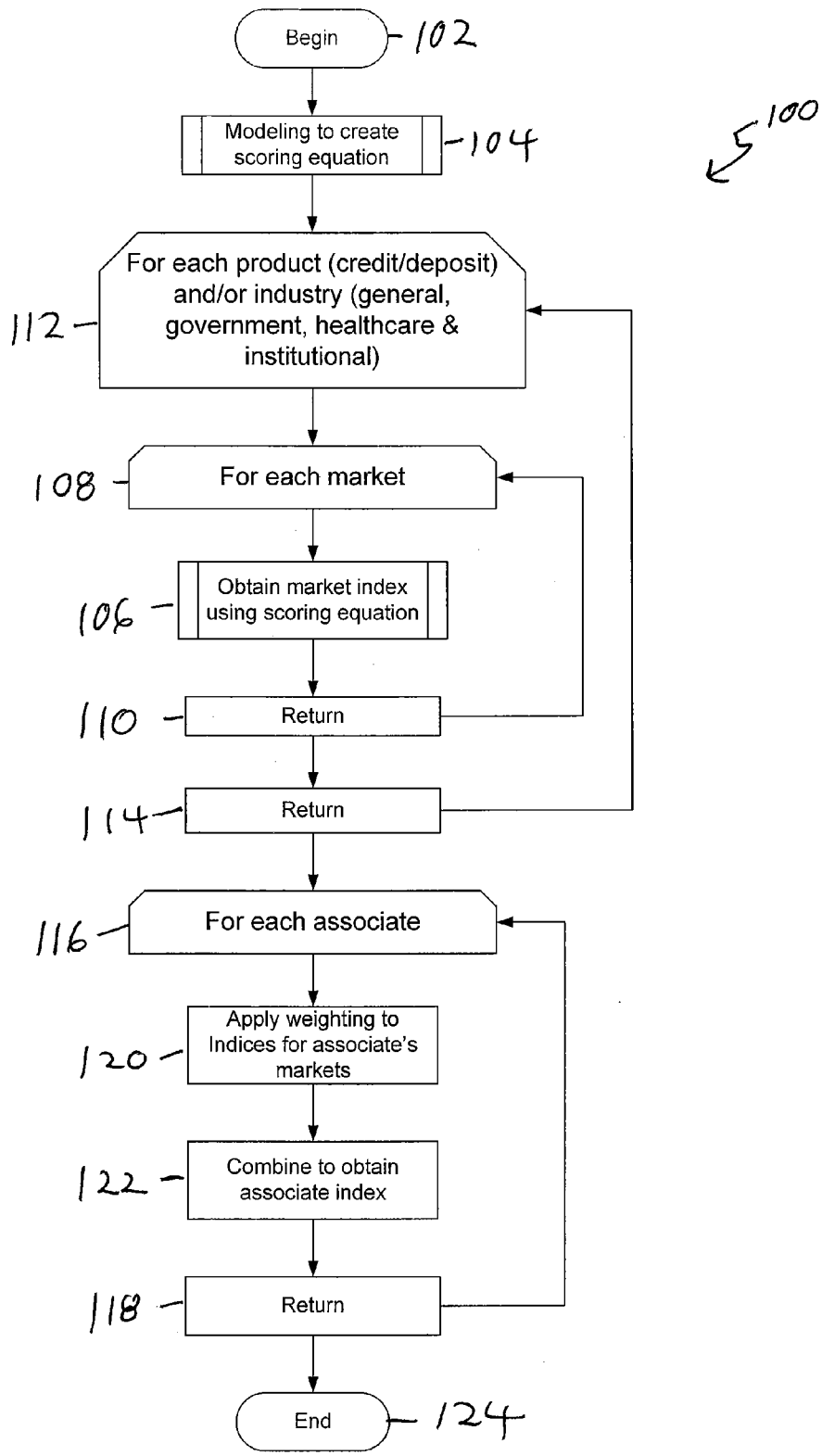
FIG. 1 is a flowchart illustrating the overall high-level process of an embodiment of the invention that is used for associate goal setting.

The following detailed description of embodiments refers to the accompanying drawings, which illustrate specific embodiments of the invention. Other embodiments having different operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be used. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, processing platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus, and systems including computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

It may be helpful for the reader to understand some definitions of terms from this point forward. Other terms are intended to have their ordinary meaning within the relevant art, or will be defined when first introduced. It should be understood that terms like "bank" and "financial institution" are used herein in their broadest sense. Institutions, organizations, and corporations that maintain various types of financial accounts are widely varied in their organization and structure, as well as are the accounts themselves. These terms are intended to encompass all possibilities, including but not limited to finance companies, stock brokerages, credit card companies, telephone companies, mortgage companies, manufacturers who provide financial services associated with the purchase of goods, etc. For that matter, to the extent embodiments are presented herein as used by a financial institution for evaluating market opportunity for credit or treasury and trade products, these embodiments are examples only.

The methodology of the invention can be used by any type of business whatsoever. With different kinds of businesses, it may be that different market variables and/or public data sources need to be used as can be determined by one of skill in the relevant art. The term "enterprise" is simply used herein to refer to a business making use of an embodiment of the inventions. The term "associate" refers to employees or contractors of the enterprise.

Reference is made herein to obtaining internal or enterprise data, as well as public data or data from "public sources." Enterprise data is simply data on sales, customers, accounts and the like that any enterprise would typically possess. Public data refers to data compiled from sources external to the enterprise. It does not have to be public in the sense that it is freely available. Indeed, various companies sell aggregated data. However the term public data is intended to invoke data that anyone can obtain and compile or have compiled, although it may be necessary to pay for this service. Examples include data from Dunn & Bradstreet, the United States Census Bureau, and Moody's Economy.com ("Moody's").

Reference is made herein to "geographic areas" or "geographic statistical areas" as well as "metropolitan statistical areas" (MSA's) and the like. These synonymous terms are intended to suggest specific geographic areas for which scaled index scores are provided using embodiments of the invention. For example, nationwide or even worldwide index data could be broken down by postal code, country, state and/or province, or city. In the specific examples herein, indexes are assigned by metropolitan area such as the New York City metropolitan area and the Washington-Arlington-Alexandria DC-VA-MD-WV metropolitan area, in the United States.

Turning now to FIG. 1, a conceptual flowchart showing one example high-level process making use of embodiments of the invention is illustrated. Like most flowchart illustrations, this flowchart represents the process as a series of process or sub-process blocks. Process 100 of FIG. 1 can be conceptually broken down into three high-level portions: modeling, scoring, and application. The overall process begins at block 102. At block 104, modeling is undertaken to produce a scoring equation. Additionally, as will be appreciated when the sub-process of block 104 is viewed in detail relative to FIG. 2, the average revenue per market is produced by block 104. Scoring is undertaken at block 106 to obtain scaled market indices. In this example embodiment, a market index is obtained for each geographic market as indicated by loop limit 108 and return block 110. Separate indices can also be produced for various industries and product types as indicated by loop limit 112 and return block 114. For example, in a financial institution, product types can include credit products and deposit (treasury and trade) products and industries might include general, government, or healthcare and institutional industries. Once these sub-processes are completed, geographic market indices that indicate relative market opportunity among various geographic areas are known and can be applied.

Still referring to FIG. 1, the remainder of process 100 illustrates on example application of the market indices that indicate geographic market opportunity. For each sales associate in the financial institution, as indicated by loop limit 116 and return block 118, weighting is applied at block 120 to the indices for the markets served by the associate, to accurately reflect the percentage of the associate's business that is in each market. These weighted indices are then combined at block 122 to obtain a market opportunity index for the associate, which can in turn be used for goal setting. Process 100 ends at block 124.

Figure 2:
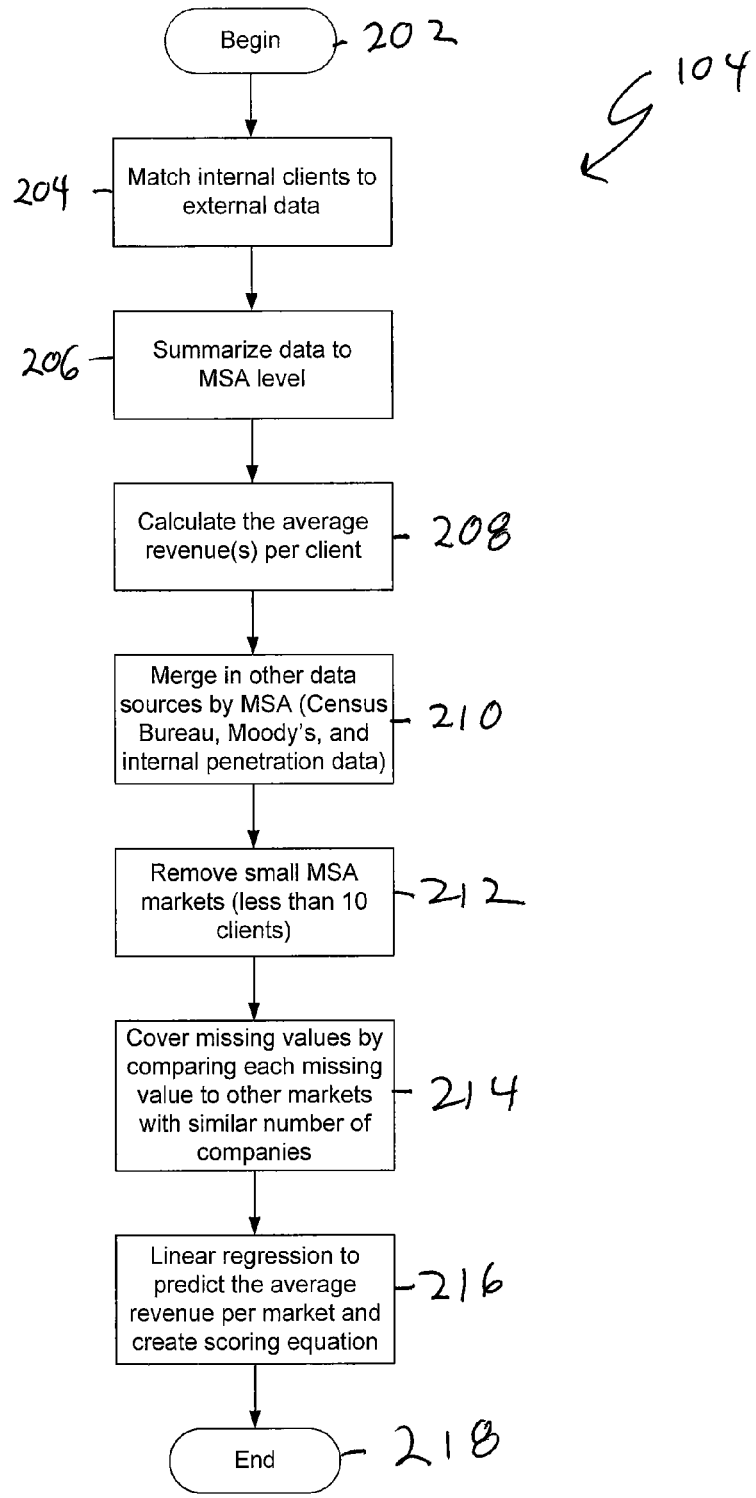
FIG. 2 is a flowchart illustrating modeling and creation of a scoring equation according to example embodiments of the invention.
Figure 3:
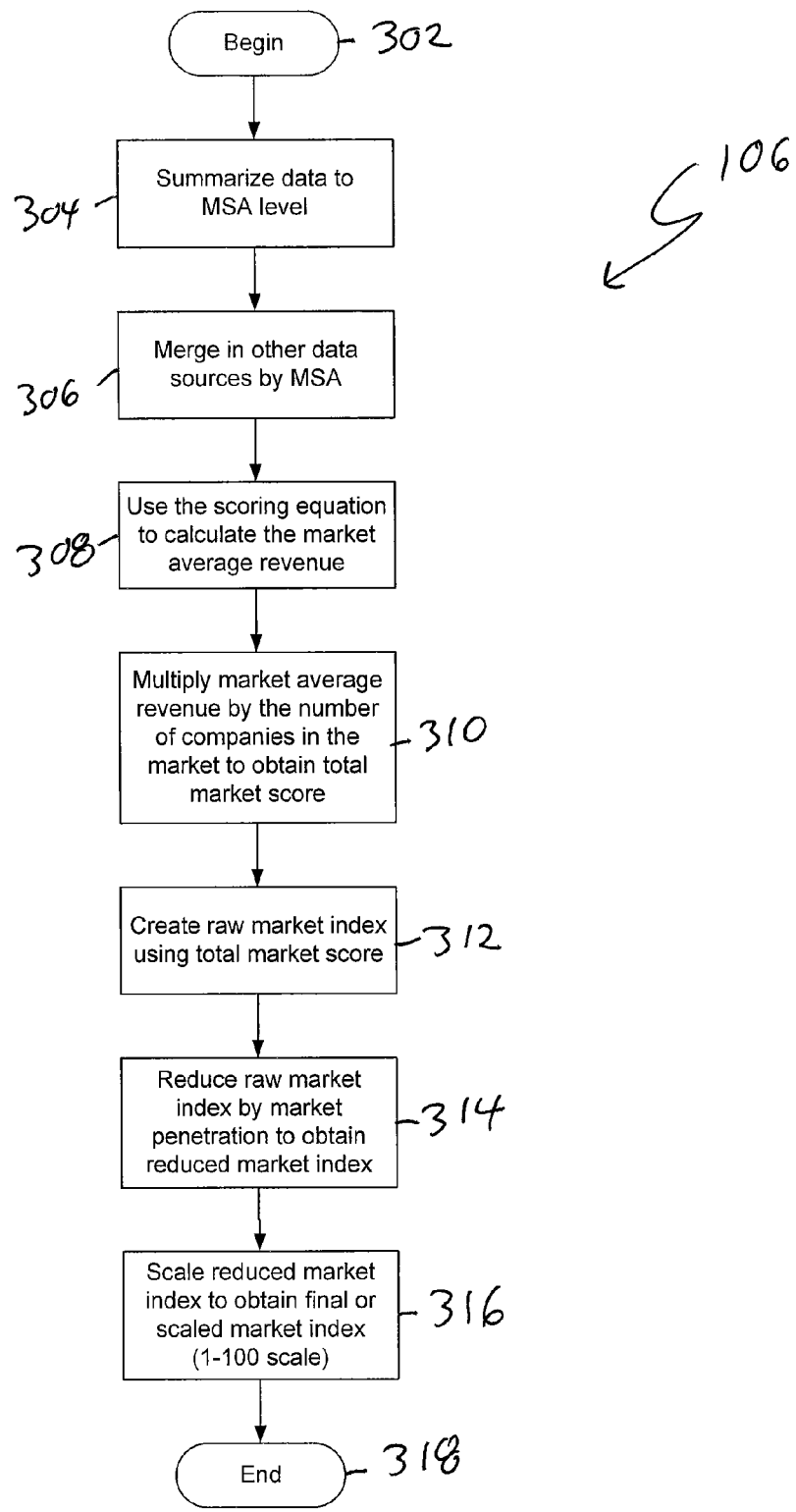
FIG. 3 is a flowchart illustrating generation of a scaled market index from the scoring equation according to example embodiments of the invention.

FIGS. 2 and 3 illustrate example embodiments of the modeling and scoring processes in more detail, respectively. Again, it cannot be overemphasized that the modeling and scoring methodology disclosed herein has many different applications. The associate goal setting discussed herein is but one example. For purposes of the example embodiments disclosed herein, assume the processes illustrated in FIGS. 2 and 3 are being used by a financial institution to evaluate market opportunity relative to credit and "treasury and trade" products in different industries in which client companies operate. Again, these processes are not limited to such an application, but such an assumption for purposes of this example provides a framework for understanding the details of these embodiments of the invention.

Statistics are used to create a scoring equation that estimates revenue by taking current clients' revenue and those clients' corresponding Dun & Bradstreet demographics along with market economic information such as unemployment and personal income data, as well as enterprise data on servicing centers and customer penetration. The equation is then applied to all companies in the market to estimate total market opportunity. Market penetration can be calculated by taking the Dunn & Bradstreet data and matching those records to current clients of the enterprise to capture companies that are already clients of the enterprise.

The methodology described in detail below combines client experience with external market information—and then applies that knowledge to the market as a whole to identify potential opportunity. The modeling and scoring process is designed to prioritize markets based on criteria that are correlated with the market's average revenue per client. The index ultimately produced is scaled to a score between 1 and 100. The indexing process ranks and scales markets according to each market's overall opportunity for the enterprise. In example embodiments, using a metropolitan statistical area (MSA) approach enables alignment to an enterprise's geographic organizational structure and helps to capture inherent regional differences within the footprint of a large enterprise servicing many geographic areas.

FIG. 2 illustrates the modeling process 104 in flowchart form. Process 104 begins at block 202. The modeling process uses active clients and their respective market variables to create the equation to estimate product revenue. At block 204, internal clients are matched to companies covered by the external data. The current client list at the individual level, in this example including a rolling twelve-month revenue, is matched to Dunn & Bradstreet information, based on an internal cross reference file that can be maintained by the enterprise. Only those clients that match the Dunn & Bradstreet demographic data are kept. Dunn & Bradstreet is only one example of a data provider that can be used to obtain external data. At block 206 of FIG. 2, data is summarized to the MSA market level. For example, clients can be linked to the Dunn & Bradstreet and data from public debt filings for those clients that have available public filings. For example, in the United States, filings of security interests under the Uniform Commercial Code (UCC) can be used. The demographic and UCC information can then be summarized to the MSA level based on the postal code of the client.

Still referring to FIG. 2, at block 208, the average revenue per client is calculated for each market. At block 210, other data sources can be merged by MSA. As an example, external data from Moody's and the United States Census Bureau can be combined with the enterprise's own market penetration data as well as the Dunn & Bradstreet and UCC summary data. To ensure robust data for modeling, data for small markets is removed at block 212. In some example embodiments, data for markets with less than ten clients of the enterprise is removed. To be more effective, the modeling process includes replacing missing values for a market with derived values. Thus, at block 214 missing values were replaced with average values for other markets with similar numbers of companies. An example would be replacing a missing value from the data for Miami by using the average value from the data for markets such as Cleveland, Portland, and Denver, which may have similar number of companies as Miami, assuming geographies in the United States are being modeled.

At block 216 of FIG. 2, a multiple linear regression is performed against the data to estimate the average revenue per market and create the scoring equation. Standard statistical modeling tools can be used. For example the well-known "SAS" software, including the linear regression module known as "PROC REG" can be used. Market demographics and market characteristics that are correlated to product revenue then produce an equation of the form:

Product Revenue Average=
(Market Variable 1*A)+
(Market Variable 2*B)+
(Market Variable 3*C)+
(Market Variable 4*D);

where for any given run of the model, A, B, C, D, etc. will be fixed numerical values. The equation may include more than just four market variables.

Modeling process 104 of FIG. 2 ends at block 218. In this example embodiment, industries do not have separate equations, even though different product types might. For example, the equation for healthcare and institutional (H&I) industries would be the same as the equation for general industries but only healthcare and institutional companies would be used for an H&I market index.

FIG. 3 illustrates scoring process 106. The scoring process uses the equation built in the modeling process to estimate the average market product revenue and convert the average market product revenue into a market index. Process 106 begins at block 302 of FIG. 3. At block 304, in this embodiment, the fields from demographic data and data from public debt filings (for example UCC filings) found to be statistically significant in the equation built in the modeling process for all companies are summarized to the MSA level. Fields from the other external data sources (in this example Moody's and the United States Census Bureau) as well as enterprise customer penetration data found to be statistically significant are added based on MSA at block 306. At block 308, the scoring equation is used to calculate the average revenue per client for each geographic market. To estimate the total product revenue potential from a market, the output from the scoring equation is multiplied by the number of companies in the market at block 310. This estimate is used only to rank and scale the markets against each other. It would not necessarily represent the actual total revenue of the market. For example, if the average product revenue were $50,000 for a market with 1000 companies, the total revenue potential would be $50,000,000.

The total product revenue potential may exhibit low predictability due to the amount of variance in the markets—but the model rank orders. Rank ordering means that the actual predicted amount may not be exact but the score is relatively predictive. For example, if one geographic market has a score of 5,000 and another geographic market has a score of 4,000; one can assume that the opportunity in the "5,000 market" is greater than the opportunity in the "4,000 market." At block 312 of FIG. 3, the total product revenue potential is used to create the initial or "raw" market index by scaling, which in this example is accomplished by dividing by 1,000,000. Since the raw market index is the scaled value of the total product revenue, this index also includes current clients of the enterprise.

Still referring to FIG. 3, to identify the opportunity in the market that is untouched by the enterprise, the raw market index is reduced by the percentage of companies that are already served ("covered") by the enterprise at block 314. To determine which clients are already covered by the enterprise, a company's list based on Dunn & Bradstreet data can be mapped to any client that has active revenue in some period, for example, the past twelve months. The raw market index is reduced by the proportion of covered clients to produce a reduced market index. At block 316, the reduced market index is then scaled again to a value between one and one hundred so that comparisons between geographic markets are easy to interpret. Continuing with the example above, the number of companies is 1,000, and if the number of clients already covered by the enterprise is 500, the reduction amount is 50% and the total revenue potential is $50,000,000. The raw market index is then 50 and the reduced market index is 25. The scaled reduced market index would be 50*(1−0.50), or 25. Process 106 ends at block 318.

Figure 4:
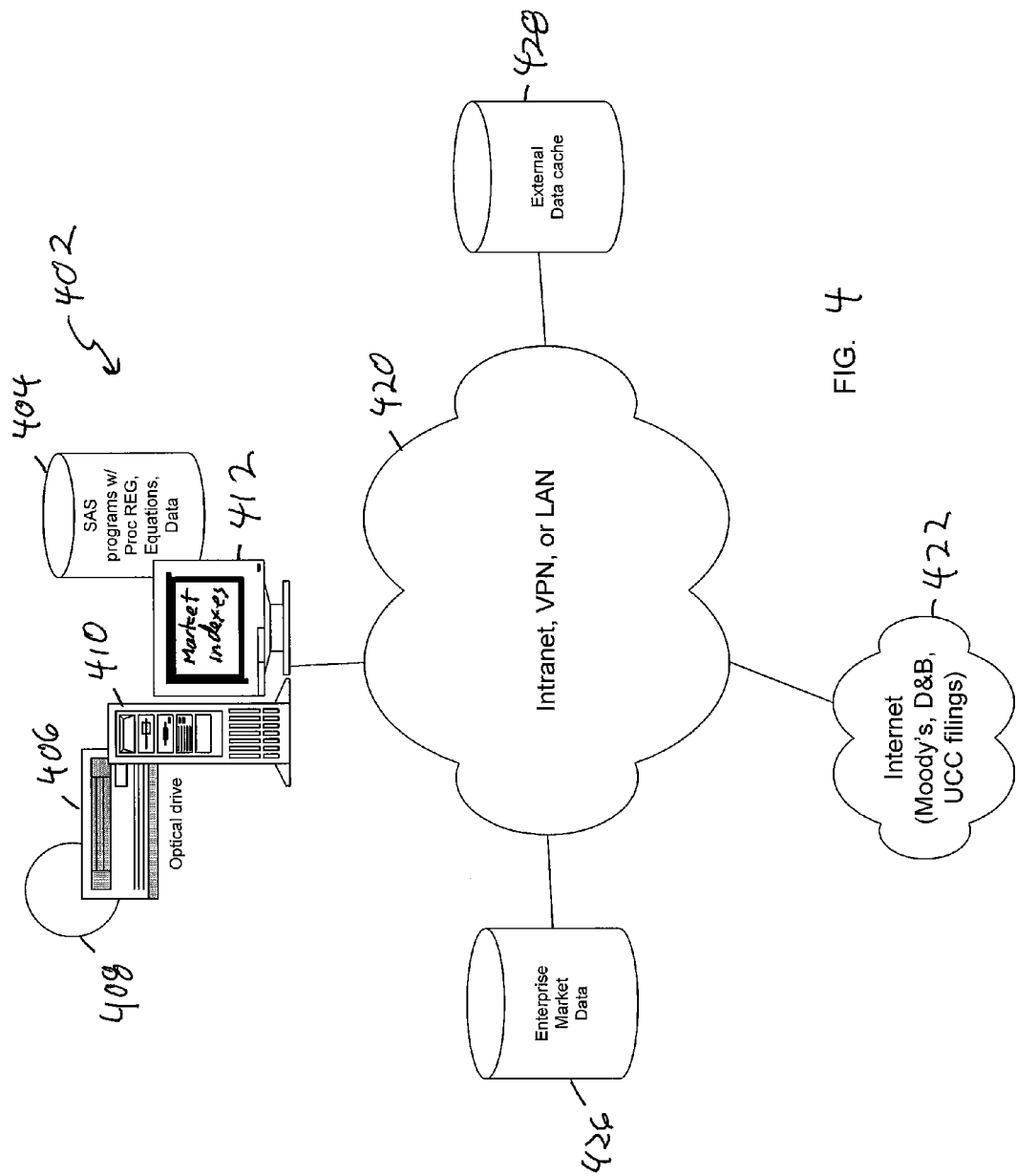
FIG. 4 is a system block diagram that illustrates an example operating environment for an embodiment of the invention.

FIG. 4 illustrates a typical operating environment for embodiments of the present invention. System 402 can be a workstation or personal computer system. The system includes a fixed storage medium, illustrated graphically at 404, for storing programs and/or macros which enable the use of an embodiment of the invention. These programs can include all or a portion of the previously mentioned SAS software. Fixed storage 404 can also include all or portions of the data, which is necessary to implement an embodiment of the invention. In this particular example, an optical drive, 406, is connected to the computing platform for loading the appropriate computer program product into system 402 from an optical disk, 408. The computer program product includes a computer program or programs with instructions or code for carrying out the methods of the invention. Processing platform 410 of FIG. 4 can execute the appropriate instructions and display appropriate screens on output device 412. These screens can include the market index values previously discussed.

Still referring to FIG. 4, system 402 can include connectivity to retrieve data from internal enterprise sources as well as external, public sources, namely, connectivity to network 424, which can be an intranet, virtual private network (VPN) connection, local area network (LAN) connection, or any other type of network connection, as well as the Internet, 422. Data store 426 can contain enterprise data used in the calculations, and another data store, 428, can be used to cache information retrieved over the Internet, such as information from Moody's, Dunn & Bradstreet, and UCC filings.

To more fully enable an embodiment of the invention, further details of a specific use of the modeling and scoring process will now be discussed. Again, it cannot be overemphasized that these details represent merely one example. In particular, the process of an embodiment of the invention has been used in a large bank to predict relative market opportunity in MSA's organized according to large U.S. population concentrations as determined by zip code. These population concentrations are clustered around metropolitan centers such as New York; Washington; Chicago; Miami; Orange County, Calif.; Northern New Jersey; etc. Three different industries were indexed: general industry, government, and the healthcare & institutional (H&I) industry. Given the market variables and sources shown, one of skill in the art can readily determine which data to use in the merging and grouping of information from internal and external sources shown and discussed relative to FIGS. 2 and 3.

For deposit products, also called treasury and trade products, the following tables show the market variables in the scoring equation produced by industry, and also indicate the source of the data used to obtain values for the variables.

| General Industry | |
|---|---|
| Market Variable | Source |
| Bank deposit penetration | Bank records |
| % of companies with 1001 or more employees | Dunn & Bradstreet |
| % of companies with sales between 500M and 1B | Dunn & Bradstreet |
| Three-year change in per capita personal income | Moody's |
| % of companies that are food manufacturing | Dunn & Bradstreet |

| Government | |
|---|---|
| Market Variable | Source |
| % of companies administering general economic programs | Dunn & Bradstreet |
| Bank consumer deposit penetration | Bank records |
| % of companies with 1001 or more employees | Dunn & Bradstreet |
| Three-year change in gross metro product difference | Moody's |
| Three-year change in disposable personal income | Moody's |
| % of companies regulating, licensing, inspecting misc. commercial sector | Dunn & Bradstreet |

| H&I | |
|---|---|
| Market Variable | Source |
| Bank consumer deposit penetration | Bank records |
| % of hospital industry | Guidestar |
| Savings market average | Guidestar |
| % of family services industry | Guidestar |
| Disposable personal income for last quarter | Moody's |

For credit products, the following tables show the market variables in the scoring equation produced by industry, and also indicate the source of the data used to obtain values for the variables.

| General Industry | |
|---|---|
| Market Variable | Source |
| Bank UCC penetration | Bank records |
| % of companies with sales between 250M and 500M | Dunn & Bradstreet |

-continued

| General Industry | |
|---|---|
| Market Variable | Source |
| % of companies with sales between 500M and 1B | Dunn & Bradstreet |
| Three-year change in disposable personal income | Moody's |

| Government | |
|---|---|
| Market Variable | Source |
| % of companies administering general economic programs | Dunn & Bradstreet |
| % of companies with 501-1000 employees | Dunn & Bradstreet |
| % of companies with 1001 or more employees | Dunn & Bradstreet |
| % of companies with 251-500 employees | Dunn & Bradstreet |
| Three-year change in per capita personal income | Moody's |
| % of companies that have Executive or Legislative offices | Dunn & Bradstreet |
| Square miles | Census Bureau |

| H&I | |
|---|---|
| Market Variable | Source |
| Liabilities average | Guidestar |
| Securities average | Guidestar |
| Percent of single organization support | Guidestar |
| % of family services industry | Guidestar |
| Disposable personal income for last quarter | Moody's |
| % of senior organization | Guidestar |

FIG. 5 illustrates a portion, 500, of a screen display that might result from the modeling and scoring for the specific application discussed above. Column 502 shows the statistical "observation" number for each MSA. Column 504 indicates MSA by name. Section 506 of the screen display includes multiple columns. The first column shows the number of companies in each MSA. Moving right, the raw market indices are shown for deposit and credit products, respectively. Market penetration of the bank is in the next column. Next, each reduced market index, or each "market index with pen[etration]" is shown for deposit and credit products, respectively. Finally, the scaled market indices are shown for these two products.

The scaled marked indices output as discussed above can be used by the bank in this example to set performance goals for commercial banking sales associates. These associates can have clients located in different geographic areas. As an example, to calculate an index appropriate for use in goal setting for an associate, all clients are assigned to an MSA. Those markets which contain 15% or more of the associate's clients are identified. The scaled market index value from the markets with 15% or more of the associate's clients can be weighted using the deposit or credit revenue index to estimate the associate index value, depending on whether the associate works with deposit products or credit products. For example, assume associate Jane Doe works with deposit products and has 100 Clients, 50 of her client are in Metropolitan Area A, which has an index of 100 and 25 of her are in Metropolitan Area G, which has an index of 38.07. Her other 25 clients are scattered. If the average deposit revenue for the Area A clients was $1,000 and the average revenue from the Area G clients was $500, the calculation for Jane Doe's associate index would be:

$$((1{,}000*100)+(500*38.07))/(1{,}000+500)=119035/1500=79.36$$

In effect, the numerator of the equation contains weighted index values obtained my multiplying the revenue of Jane's clients for each area by the scaled market index. If an associate works with more than one product type or industry, the weighting process can be repeated across industries or product types.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "less" and "greater", are intended to encompass the concept of equality, thus, "less" can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of evaluating relative market opportunity among a plurality of geographic statistical areas serviced by an enterprise comprising a financial institution, the method comprising:
    merging data from both enterprise sources and public sources to create summarized data corresponding to the plurality of geographic statistical areas, wherein the data from the enterprise sources comprises non-public data relating to sales, customers, and/or accounts of the financial institution;
    determining, via a computing device processor, a scoring equation and an average revenue per market using linear regression of the summarized data, the scoring equation taking into account a plurality of market variables;

calculating a raw market index for each geographic statistical area of the plurality of geographic statistical areas at least in part using the scoring equation, wherein the raw market index for each geographic statistical area is indicative of total revenue potential for the geographic statistical area inclusive of revenue potential from existing clients of the enterprise;

reducing the raw market index in accordance with market penetration of the enterprise;

producing a scaled market index for each geographic statistical area using the reduced raw market index, wherein the scaled market index is indicative of the revenue potential from sources excluding existing clients of the enterprise; and comparing the scaled market indices for the geographic statistical areas to determine revenue potential of a selected geographical statistical area relative to other geographic statistical areas.

2. The method of claim 1 further comprising:

applying weighting to a plurality of scaled market index values in accordance with selected geographic statistical areas serviced by an associate to produce weighted market index values; and combining the weighted market index values to produce an associate index indicating a market opportunity for the associate.

3. The method of claim 1 wherein the scaled market index is indicative of the relative market opportunity for a specific industry.

4. The method of claim 1 wherein the scaled market index is indicative of the relative market opportunity for a specific product type.

5. The method of claim 4 wherein the enterprise is a financial institution and the specific product type is at least one of at least deposit products and credit products.

6. The method of claim 2 wherein the scaled market index is indicative of the relative market opportunity for a specific industry.

7. The method of claim 2 wherein the scaled market index is indicative of the relative market opportunity for a specific product type.

8. The method of claim 7 wherein the enterprise is a financial institution and the specific product type is at least one of at least deposit products and credit products.

9. The method of claim 3 wherein the scaled market index is indicative of the relative market opportunity for a specific product type.

10. The method of claim 9 wherein the enterprise is a financial institution and the specific product type is at least one of at least deposit products and credit products.

11. A computer program product to facilitate evaluating relative market opportunity among a plurality of geographic statistical areas serviced by an enterprise comprising a financial institution, the computer program product including a non-transitory medium having computer program code embodied therein, the computer program code comprising:

instructions for merging data from both enterprise sources and public sources to create summarized data corresponding to the plurality of geographic statistical areas, wherein the data from the enterprise sources comprises non-public data relating to sales, customers, and/or accounts of the financial institution;

instructions for determining a scoring equation and an average revenue per market using linear regression of the summarized data, the scoring equation taking into account a plurality of market variables;

instructions for calculating a raw market index for each geographic statistical area of the plurality of geographical statistical areas at least in part using the scoring equation, wherein the raw market index for each geographic statistical area is indicative of total revenue potential for the geographical statistical area inclusive of revenue potential from existing clients of the enterprise;

instructions for reducing the raw market index in accordance with market penetration of the enterprise; and instructions for producing a scaled market index for each geographic statistical area using the reduced raw market index, wherein the scaled market index is indicative of the revenue potential from sources excluding existing clients of the enterprise; and instructions for comparing the scaled market indices for the geographic statistical areas to determine revenue potential of a selected geographical statistical area relative to other geographic statistical areas.

12. The computer program product of claim 11 wherein the computer program code further comprises:

instructions for applying weighting to a plurality of scaled market index values in accordance with selected geographic statistical areas serviced by an associate to produce weighted market index values; and instructions for combining the weighted market index values to produce an associate index indicating a market opportunity for the associate.

13. The computer program product of claim 11 wherein the computer program code further comprises instructions for presenting the scaled market index for a plurality of specific industries.

14. The computer program product of claim 11 wherein the computer program code further comprises instructions for presenting the scaled market index for a plurality of specific product types.

15. The computer program product of claim 14 wherein the computer program code further comprises instructions for presenting the scaled market index for a plurality of specific industries.

16. The computer program product of claim 12 wherein the computer program code further comprises instructions for presenting the scaled market index for a plurality of specific product types.

17. The computer program product of claim 13 wherein the computer program code further comprises instructions for presenting the scaled market index for a plurality of specific product types.

18. The computer program product of claim 15 wherein the computer program code further comprises instructions for presenting the scaled market index for a plurality of specific product types.

19. A system to facilitate evaluation of relative market opportunity among a plurality of geographic statistical areas serviced by an enterprise comprising a financial institution, the system comprising:

a computer comprising a processing platform to:

merge data from enterprise sources and public sources to create summarized data corresponding to the plurality of geographic statistical areas, determine a scoring equation and an average revenue per market using linear regression of the summarized data, the scoring equation taking into account a plurality of market variables, calculate a raw market index for each geographical statistical area of the plurality of geographic statistical areas at least in part using the scoring equation, wherein the raw market index for each geographic statistical area is indicative of total revenue potential for the geographical statistical area inclusive of revenue potential from existing clients of the enterprise, reduce the raw market index in accordance with market penetration of the enterprise, and produce a scaled market index for each geographic statistical area utilizing the reduced raw market index, wherein the scaled market index is indicative of the revenue potential from sources excluding existing clients of the enterprise, and compare the scaled market indices for the geographic statistical areas to determine revenue potential of a selected geographical statistical area relative to other geographic statistical areas; and an output device to present the scaled market index for a plurality of specific industries and a plurality of specific product types related to the enterprise.

20. The system of claim 19 further comprising network connectivity to retrieve data from both enterprise sources and public sources to create the summarized data.

21. The system of claim 19 wherein the processing platform is further operable to apply weighting to and combine a plurality of scaled market index values in accordance with selected geographic statistical areas serviced by an associate to produce an associate index indicating a market opportunity for the associate.

22. The system of claim 20 wherein the processing platform is further operable to apply weighting to and combine a plurality of scaled market index values in accordance with selected geographic statistical areas serviced by an associate to produce an associate index indicating a market opportunity for the associate.

* * * * *